United States Patent Office 3,424,526
Patented Jan. 28, 1969

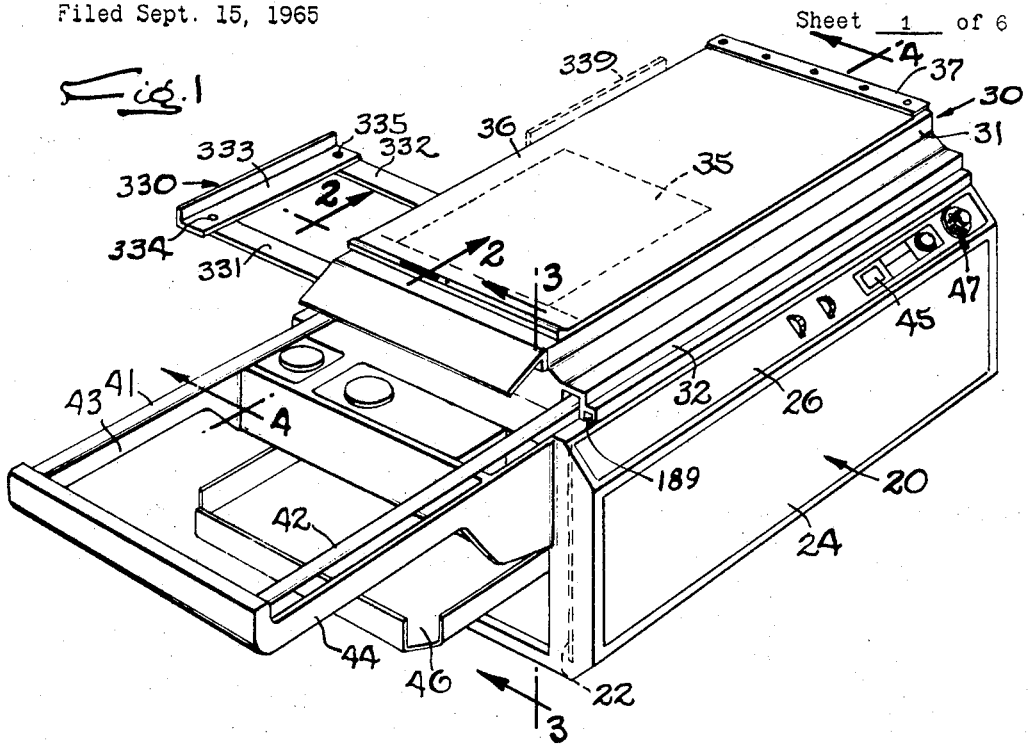
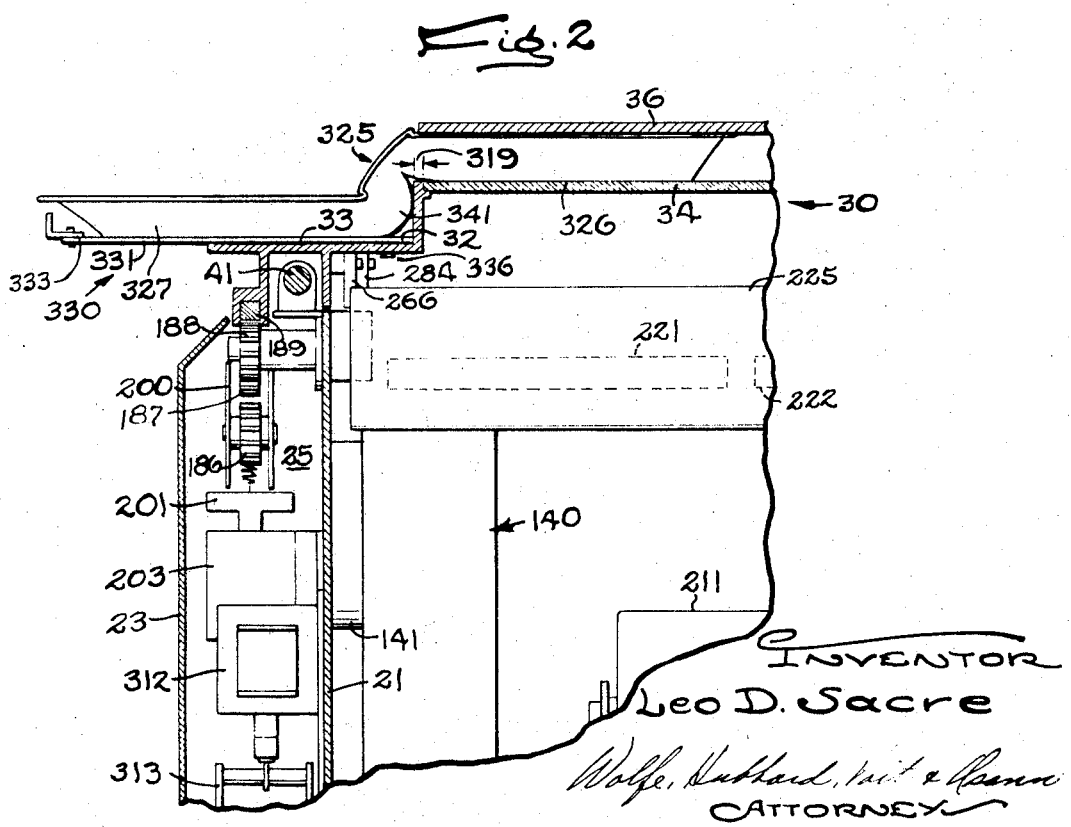

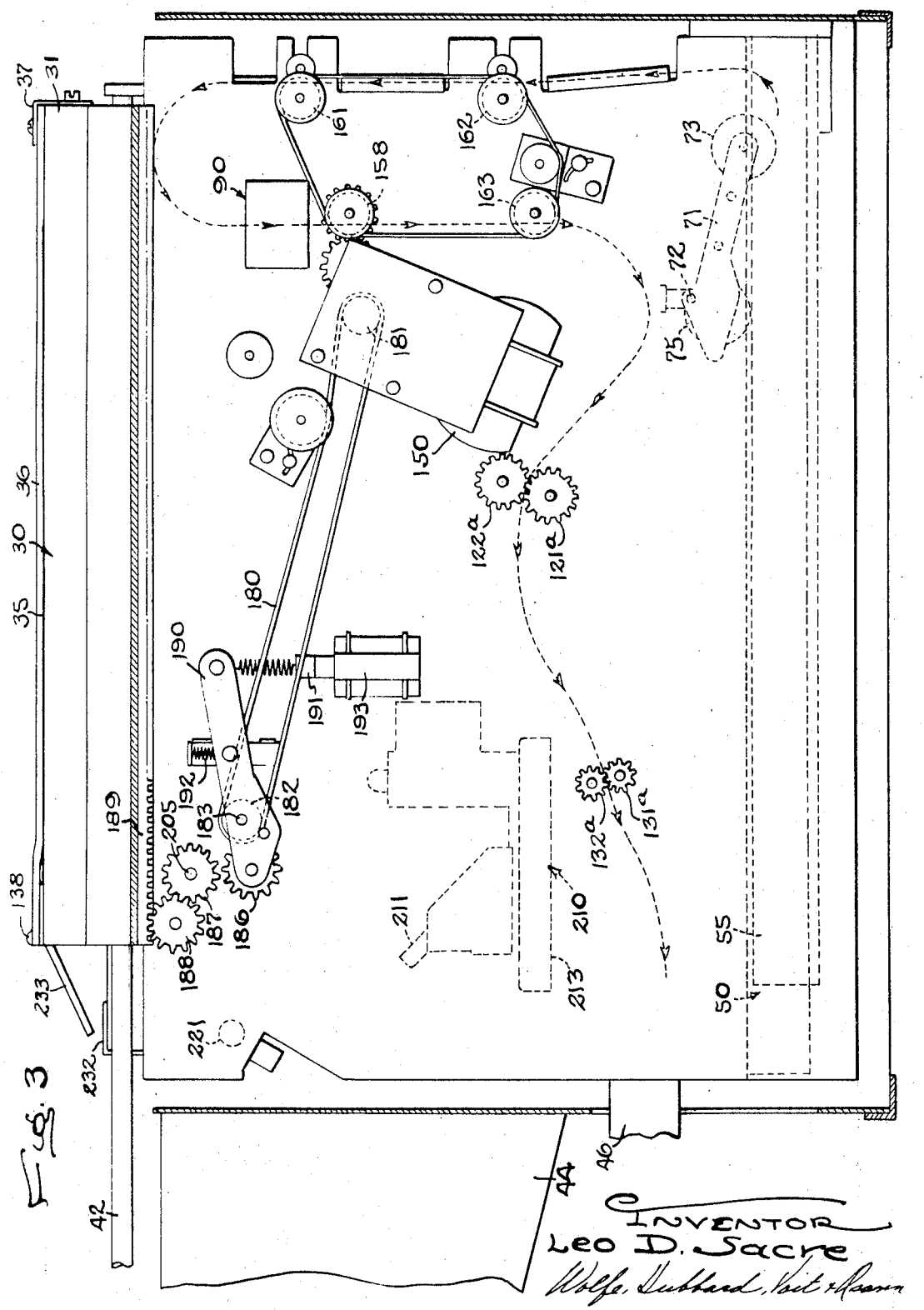

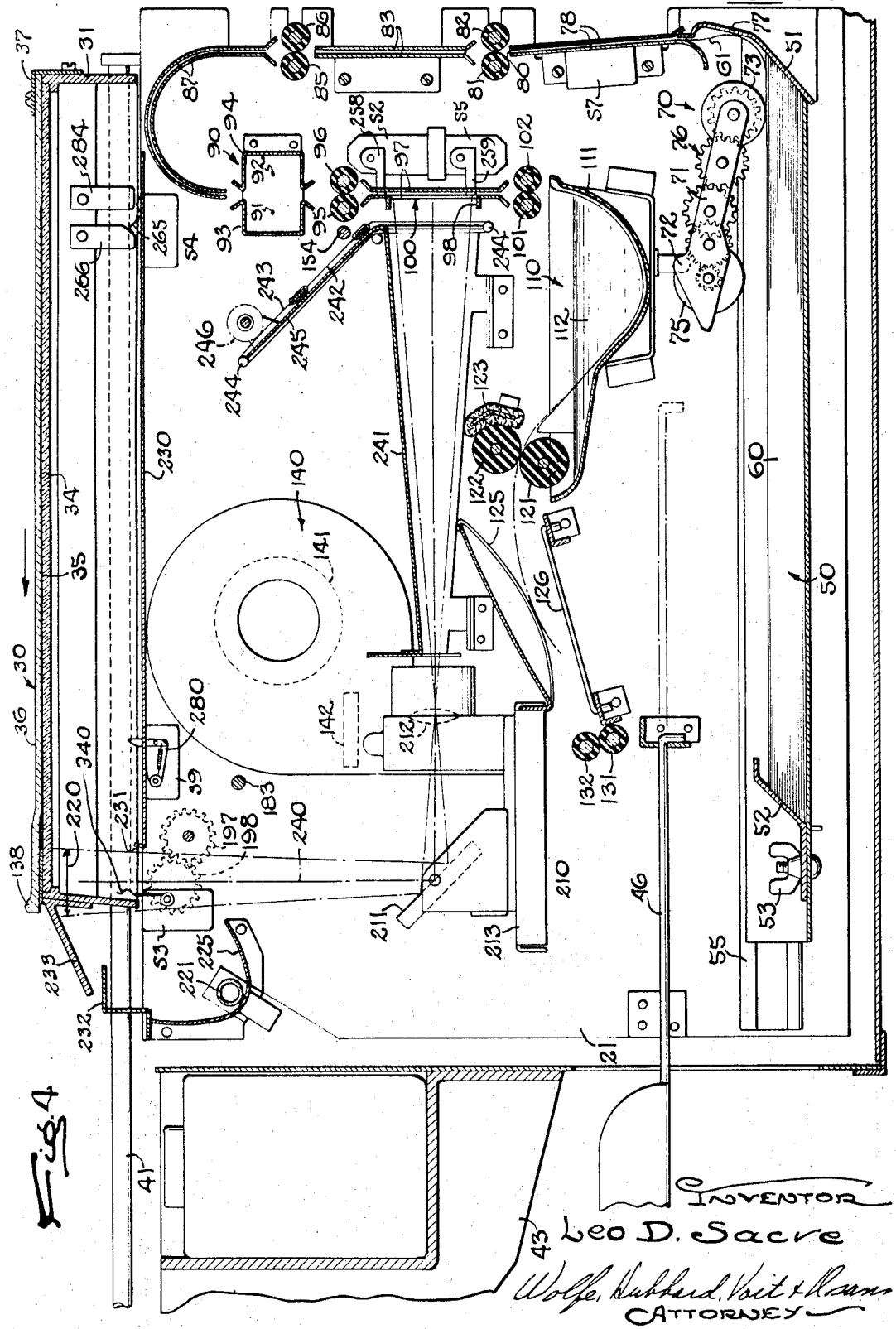

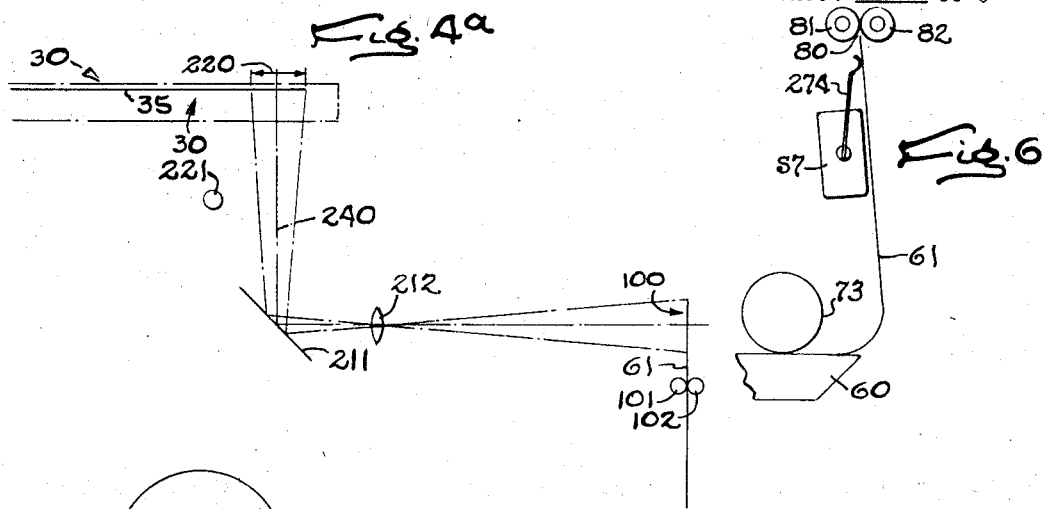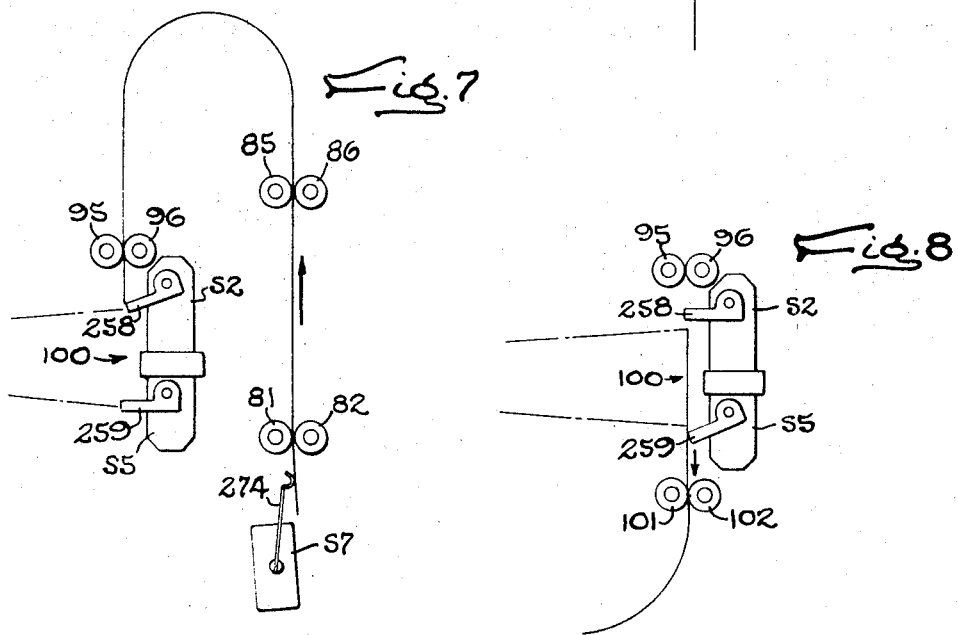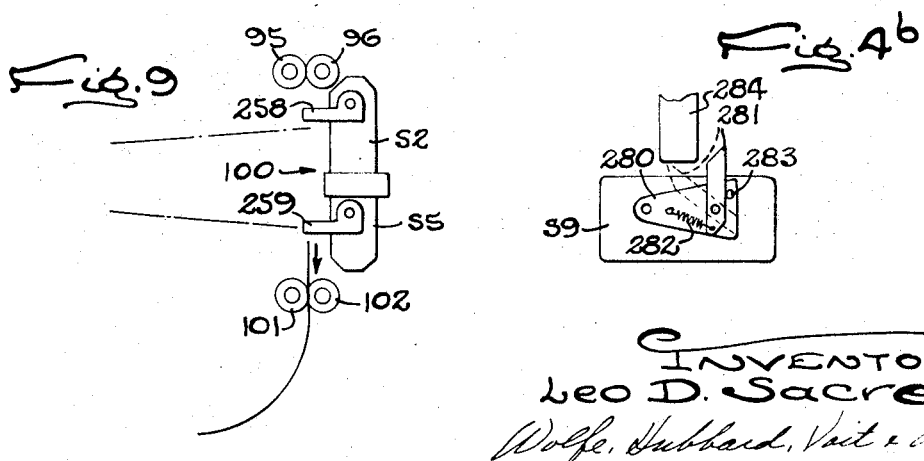

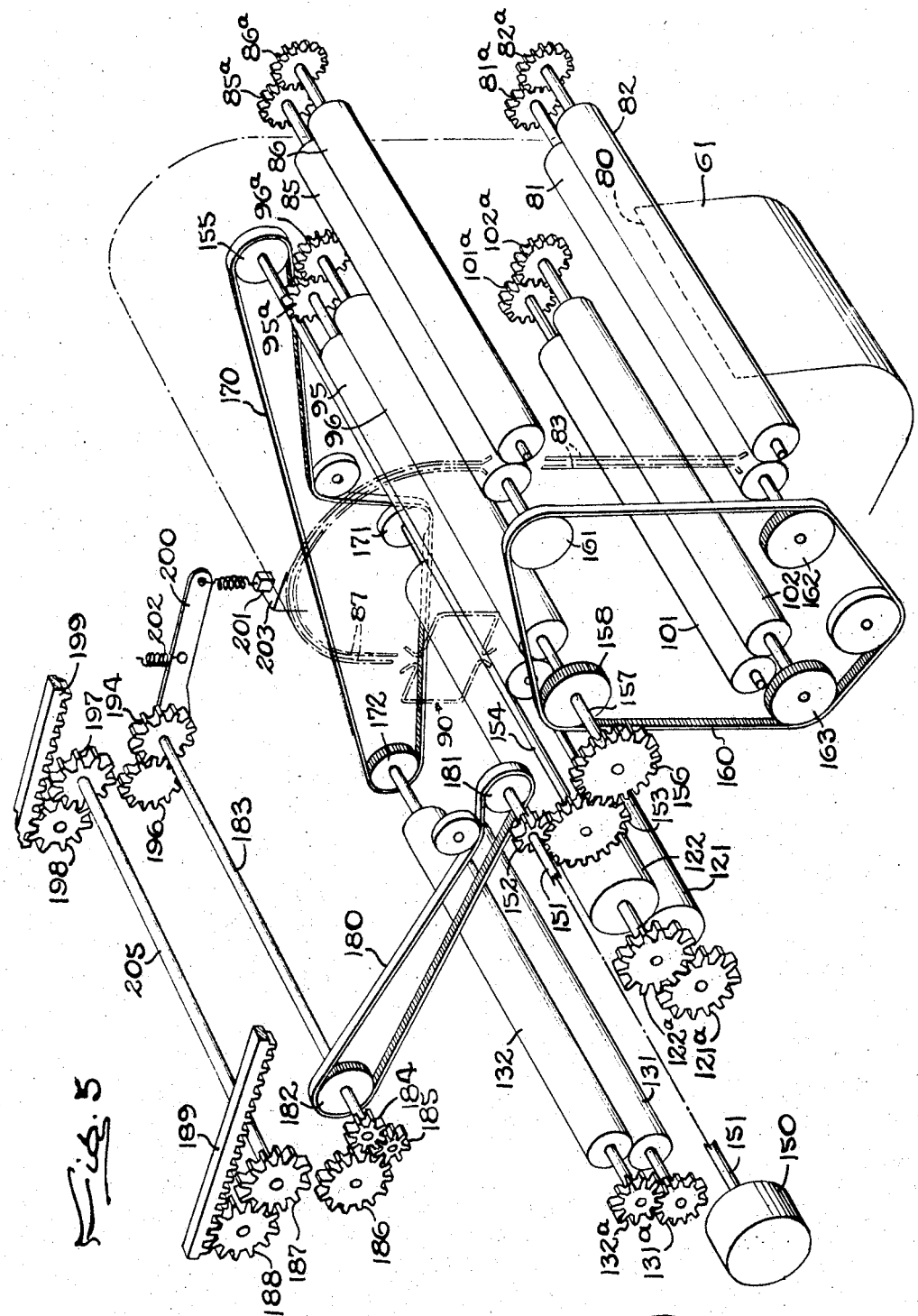

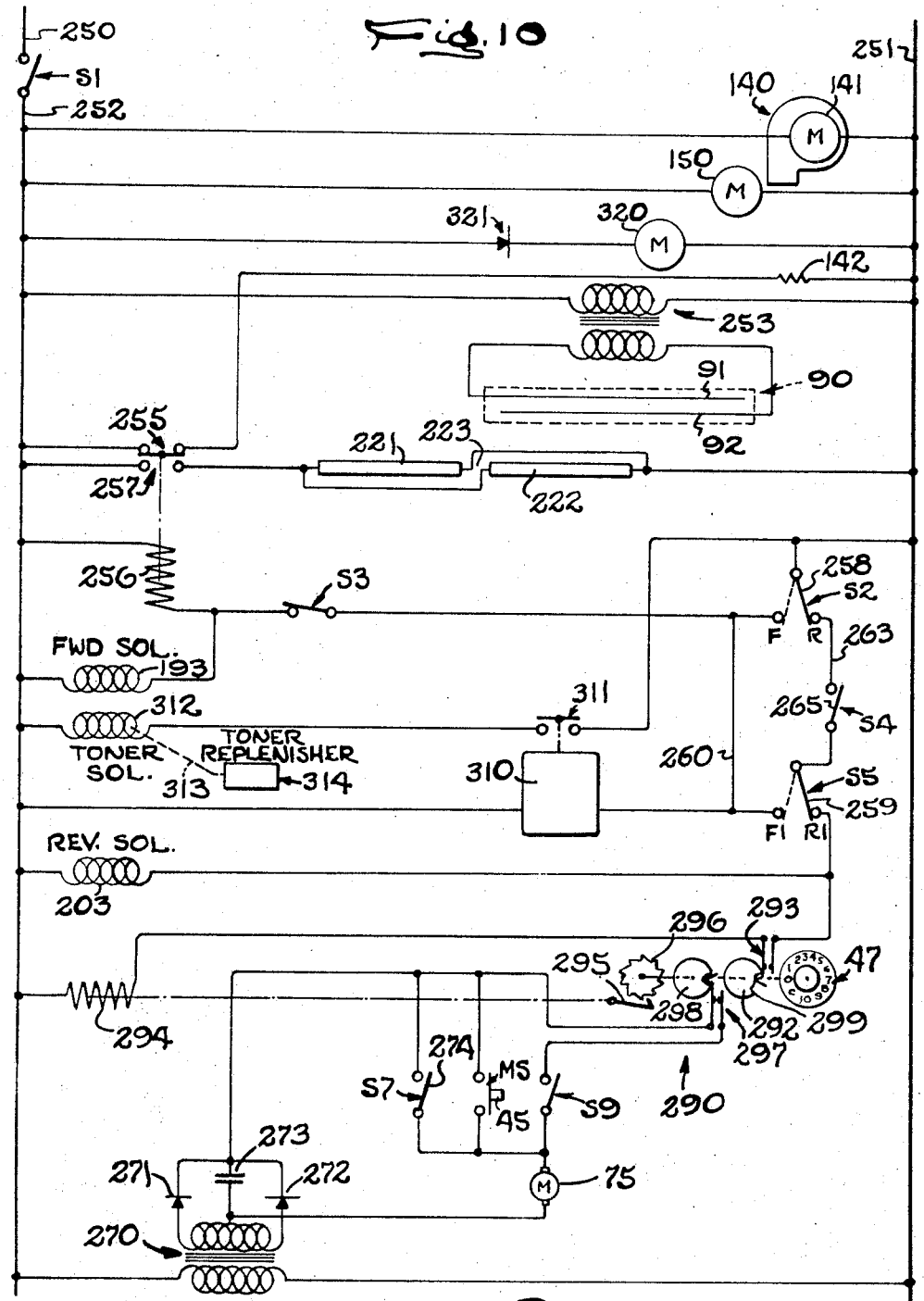

3,424,526
PHOTOCOPY MACHINE HAVING MOVING
CARRIER FOR ORIGINAL
Leo D. Sacre, Prospect Heights, Ill., assignor to American Photocopy Equipment Company, Evanston, Ill., a corporation of Illinois
Filed Sept. 15, 1965, Ser. No. 487,496
U.S. Cl. 355—10           19 Claims
Int. Cl. G03g 1/22

ABSTRACT OF THE DISCLOSURE

An office type photocopy machine which includes a transparent original carrier at the top of the machine housing and mounted for reciprocating movement relative to an illuminating station. A copy sheet dispenser includes a dispensing motor for automatically advancing photosensitive copy sheets to a ready position, from which a transport mechanism moves the copy sheets through charging, exposing, and developnig stations. Forward and reverse driving trains, including forward and reverse clutches, are connected to the carrier for reciprocating it. The forward clutch is energized to initiate movement of the carrier by switch means responsive to the arrival of the leading edge of a copy sheet at the exposing station. A stationary optical means optically couples the original on the carrier at the illuminating station with the copy sheet at the exposing station so that the image of the moving original is cast upon the moving copy sheet. The switch means includes means for de-energizing the forward clutch and energizing the reverse clutch following departure of the trailing edge of the copy sheet from the exposing station for reverse movement of the carrier, and a repeat switch operated incident to the reverse movement of the carrier energizes the dispensing motor for feeding the next copy sheet from the ready position to the sheet transport mechanism for making multiple copies. A counting means is included for counting the multiple copies.

The present invention relates to office photocopy machines and more particularly to the type of machine in which the original is supported, during exposure, upon a reciprocated carrier.

In the past office photocopy machines have fallen most generally into two categories, desk top machines having fixed optics with movement of both original and copy sheet within the machine during the exposure and console machines in which the original is held stationary upon a transparent platen, with movement of the optical system during the exposure for projection of a scanned image upon the copy sheet or receiving surface. It has been proposed by Magnusson in Patent 2,959,095 to employ a fixed optical system and to support the original document on a movable platen or carrier during exposure but there are a number of drawbacks to the Magnusson design which prevent the machine from being a solution to the photocopy problem faced by most business offices.

It is accordingly a main object of the present invention to provide a photocopy machine which possesses the advantages of both prior types of machines but without the usual accompanying disadvantages. More specifically it is an object to provide a photocopy machine which may be made sufficiently light and compact for portable or desk top usage but in which the original is kept flat and fixedly supported on an exposing platen with no possibility of the original becoming damaged in the copying process. Thus it is an object to provide a machine which may be universally employed for copying originals which are in book form or otherwise bound or mounted to preclude feeding by means of feed rollers or the like as well as originals in sheet form.

It is another object of the present invention to provide an office type photocopy machine which is capable of producing sharp high quality copies at a high rate of speed but which is nevertheless relatively simple and inexpensive. Thus it is an object of the invention to provide an improved photocopy machine which employs an optical system which is rigidly fixed within the machine and which may be made at low cost combined with relatively simple driving elements. Accordingly it is an object of the invention to provide a machine which tends to remain in adjustment throughout its useful life and which does not require the service adjustments of machines in which the original is internally transported or machines in which the optics must be moved in a coordinated fashion.

It is a related object to provide a desk top photocopy machine capable of producing multiple copies but in which the precautions usually required for successful recycling are no longer necessary and in which there is no risk of damaging the original or spoiling the copy by reason of creep or skew which may occur where the original sheet is repeatedly recirculated within the machine.

It is still another object of the invention to provide a machine of the above type in which the stroke of movement of the original is varied automatically in accordance with the length of copy sheet being used, enabling prompt and rapid return of the original carrier to its home position just as soon as the exposure has been completed. In this connection it is an object to provide a novel carrier transport in which the carrier is moved forwardly at a speed precisely synchronized with movement of the copy sheet but in which the carrier is returned at a speed which substantially exceeds that of the copy sheet. Thus it is an object of the invention in one of its aspects to provide two separate driving trains, or couplings, one for forward advancement and the other for rapid reverse, with novel means for effecting transfer from one train to the other.

It is yet another object to provide a photocopy machine having a novel control arrangement for achieving accurate register of the image of the original upon the photocopy sheet. Thus it is an object to provide a photocopy machine in which forward movement of the original carrier is initiated upon arrival of the leading edge of the photocopy sheet at the exposing station, with reversal of the original carrier back to home position immediately upon the departure of the trailing edge of the sheet from the exposing station.

It is a further object of the present invention to provide a photocopy machine which has a self-contained supply of copy sheets, the leading one of which is moved automatically to a "ready" position adjacent inlet elements of the copy sheet transport so that only slight movement of the copy sheet suffices to set the copy sheet in motion along the transport path. Thus it is an object to provide a photocopy machine capable of production of multiple copies with negligible lost time between successive copies and which insures precise registration of the image on each sheet, with scanning of the original being separately triggered by entry of each copy sheet into the exposing station. In short it is an object to provide an office type photocopy machine which is ideally suited for the making of single or multiple copies of either sheets or flat work and in which the multiple copy mode is achieved with negligible expense or complication.

Other objects and advantages of the invention will become apparent upon reading the attached detailed description and upon reference to the drawings in which:

FIGURE 1 is a perspective view of a photocopy machine constructed in accordance with the present invention.

FIG. 2 is a fragmentary section looking along the line 2—2 in FIG. 1, and with a book on the original carrier.

FIG. 3 is a side elevation of the machine with the side cover plate removed to reveal certain of the elements of the drive mechanism looking along the line 3—3 in FIG. 1.

FIG. 4 is a vertical section taken longitudinally through the machine along the line 4—4 in FIG. 1.

FIG. 4a is a fragmentary view showing the original carrier at the end of its scanning stroke.

FIG. 4b is a fragmentary view showing operation of the "repeat" switch as the carrier moves back into its home position.

FIG. 5 is an exploded perspective showing the drive elements.

FIGS. 6, 7, 8, and 9 are stop motion diagrams showing the progress of a typical copy sheet through the machine; and FIG. 10 is an across-the-line electrical diagram showing the power and control circuitry.

While the invention has been described in connection with a preferred embodiment, it will be understood that we do not intend to be limited to the particular embodiment shown but, on the contrary, intend to cover the various alternative and equivalent constructions included within the spirit and scope of the appended claims.

Turning now to the drawings there is shown a photocopy machine having a housing 20 of generally rectangular shape having vertical frame plates 21, 22, one on each side and spaced from one another for the mounting of the shafts of the various rollers which comprise the driven mechanism. Spaced outwardly from the frame plates and removable for access are cover plates 23, 24. This provides space, as indicated at 25 (FIG. 2) for the motor, pulleys, gears and the like as well as for the electrical control components. The switches and controls for operating the machine are mounted on a control panel 26.

Arranged horizontally at the top of the machine in conforming relation is an original carrier 30 of rectangularlar shape having a frame 31 of a narrow cross section flanged by integral, outwardly extending flanges 32, 33. The frame and flanges may be made of an aluminum casting. Supported within the frame upon a narrow peripheral ledge is a transparent glass platen 34 upon which the original, indicated at 35 is placed, face down, during the making of a copy. For holding the original in place and for preventing entry of extraneous light, the glass platen is covered by a flexible pad 36 of rubber-like plastic secured at one end to an anchoring strip 37 and having a reinforced edge 38 at its free end which may be readily grasped by the finger tips of the operator.

For the purpose of mounting the carrier 30 for reciprocating movement relative to the housing, spaced guide rails 41, 42 are provided extending across the top of the housing beyond one end thereof with their outward ends supported in brackets 43, 44 respectively. As will be discussed, with an original sheet in place on the carrier, the touching of a control button 45 results in the setting in motion of a sequence in which a copy sheet is transported within the machine accompanied by endwise movement of the carrier resulting in scanning of the original and the processing of the copy sheet for final deposition of the copy sheet on a collecting tray, indicated at 46, which lies underneath the supporting brackets. And, as will be seen, multiple copies may be produced simply by dialing the desired number on the dial 47 located on the control panel.

Turning next to FIG. 4 which shows the internal layout of the machine, copy sheets are stored, face down, in a reservoir 50. The copy sheets, as understood by one familiar with this art have a layer of photosensitive material dispersed in a dielectric binder supported on a paper backing. The reservoir is in the shape of a tray having a sloping forward edge 51 and a rear edge 52 which is secured in place by a wing nut 53 permitting the rear edge to be positioned in accordance with the size of the sheet which may, for example, be of letter or legal size. For the purpose of replenishing the supply the reservoir is mounted for horizontal withdrawal upon a pair of tracks 55. The stack is indicated at 60, with the first sheet from the stack being designated 61.

For feeding the sheets in succession, a dispensing mechanism 70 is used, having a frame 71 horizontally pivoted at 72 and carrying, as lower end, a rubber roller 73 which bears, by gravity, against the topmost sheet. For rotating the roller the mechanism includes a dispensing motor 75 which is coupled to the roller by means of a gear train 76. Thus, when the motor is energized, rotation of the rubber roller 73 causes the top sheet 61 to be urged endwise, the leading edge being directed upwardly by a guide 77 between a pair of vertical guide plates 78. The internal surface of the front edge 51 is suitably roughened to hold in place the succeeding sheets. Control means are provided, as will be discussed, so that the copy sheet 61 stops in a "ready" position indicated at 80.

From the "ready" position the sheet passes into the nip of a pair of driven inlet rollers 81, 82 and between further vertical guide plates 83. Continuing in its upward path the copy sheet passes into the nip of a pair of transfer rollers 85, 86 and into a set of curved guide plates 87 which turn the sheet 180°. Upon passing from the guide plates 87 the sheet travels into a charging station or corona unit 90 having charging wires 91, 92 which are charged to high voltage and contained within mutually facing shields 93, 94 respectively. Leaving the charging station the sheet feeds into the nip of a pair of transport rollers 95, 96 and between a pair of guide plates 97 having an open window at the front as indicated at 98 to define an exposing station 100.

Temporarily deferring discussion of the optics, the copy sheet during exposure moves downwardly into the nip of transport rollers 101, 102 into a developing station 110. In the present instance the developing station includes a trough 111 having a body of developer fluid 112 which may, for example, consist of finely divided toner particles suspended in colloidal solution in a liquid having good dielectric properties, for example freon. From the developer tray the sheet passes into the nip of a pair of squeegee rollers 121, 122 where excess liquid is squeezed out, running back into the tray. The upper roller 122 runs in engagement with a longitudinally extending wiper 123.

Arranged in the path of movement of the advancing sheet is a deflector 125, preferably formed of a plurality of wire elements spaced side by side, which causes the leading edge of the sheet to be directed downwardly against a rack 126. The latter leads to a pair of driven expeller rollers 131, 132 which propel the developed copy sheet onto the collecting tray 46 which is preferably extensible as shown. As the copies pass outwardly in the direction of the tray 46 they are acted upon by a stream of warm air from a blower 140 driven by a motor 141 and having a heating element 142.

In order to understand the means used for driving the various transport rollers mentioned above, reference is made to FIG. 5. Here it will be noted that the drive motor indicated at 150, having a shaft 151 mounting a pinion 152, is in mesh with a gear 153 carried on a cross shaft 154 having a drive pulley 155 at the opposite end. Meshing with the gear 153 is a second gear 156 mounted on a shaft 157 having a pulley 158 about which is trained a cog belt 160. The belt serves to drive pulleys 161, 162, 163 causing all four pairs of the transport rollers to be rotated at precisely the same speed. On the opposite side of the machine a similar cog belt 170, driven by the pulley 155, serves to drive the pulleys 171, 172 which power the squeegee rollers 121, 122 and expeller rollers 131, 132 respectively. To insure positive driving of both rollers in a pair, the rollers are coupled together by meshing gears at the ends thereof identified by corresponding reference numerals with the subscript *a*.

For the purpose of reciprocating the carrier 30 in the forward and reverse directions, separate driving trains, powered by the motor 150 are used, each of the trains including a selectively energizable coupling or clutch. Considering first the means for driving the carrier in the forward direction, and referring to FIGS. 3 and 5, a carrier drive belt 180 is provided having a drive pulley 181 on the motor shaft 151 and a driven pulley 182 which is connected to an input shaft 183. At its near end, the shaft 183 carries a pinion 184 meshing with an idler gear 185 which is, in turn, in mesh with a forward drive gear 186 of double its diameter. The latter is arranged opposite a driven gear 187 which meshes with a forward rack gear 188, the latter engaging a rack 189 formed along the underside of one edge of the carrier 30.

In accordance with one of the features of the present invention, an electromagnetic means including a solenoid, is provided for bringing the forward drive gear 186 into meshing engagement with the driven gear 187. This is accomplished by mounting the gears 184, 185, 186 on a rocking frame 190 which is pivoted for rocking movement about the input shaft 183. Connected to the right hand end of the rocking frame 190, as viewed in FIG. 3, is an armature 191 having a return spring 192 and actuated by "forward" solenoid 193. Thus it will be apparent that when the solenoid is energized, sucking the armature 191 downwardly against the force of the return spring, rotation of the frame 190 swings the gear 186 upwardly into mesh with the gear 187 thereby driving the gear 188 to propel the rack 189, and the carrier, in the forward direction.

A similar means is provided, on the other side of the machine, for driving the carrier in the reverse direction. Thus we provide a gear 194 on the input shaft 183 meshing with a reverse drive gear 196 which is arranged opposite a driven gear 197. The latter in turn is in mesh with a gear 198 engaging a rack 199 along the opposite edge of the carrier. A rocking frame 200, pivoted for rocking movement about the input shaft 183 is connected to the armature 201, and return spring 202, of a "reverse" solenoid 203. When the latter is energized, rocking of the frame 200 brings the gear 196 into mesh with the gear 197 to drive the gear 198 which propels its associated rack. In order to utilize both of the racks in the driving of the carrier in both the forward and reverse directions, the driven gears 187, 197 are, as shown, interconnected by a cross shaft 205. The means for selectively energizing the solenoids will be discussed at a later point.

It will be apparent, then, that when the motor 150 is turned on, all of the pairs of drive rollers in the machine are rotated at precisely the same peripheral speed for transporting the copy sheet through the charging station, exposing station and developing station for discharge onto the collecting tray 46, the carrier being advanced at the same speed.

For the purpose of optically coupling the original 35 in the carrier 30 with the copy sheet so that the image of the moving original is cast upon the moving copy sheet, an optical projection unit 210 is used having a mirror 211 and a suitable lens 212. The latter are mounted upon a base 213 which extends between, and which is securely supported upon, the frame plates 21, 22 at the respective sides of the housing. The optical elements are positioned and adjusted to define an illuminating station, generally indicated by the numeral 220 where the original sheet is scanned upon movement of the carrier 30 in the forward direction. For the purpose of providing illumination at the illuminating station, a linear light source is employed consisting of a pair of incandescent lamps 221, 222 (see also FIG. 10) spaced from one another to provide a central space 223. The spacing provides equalized light distribution upon the copy sheet and thus compensates for the tendency of the lens 212 to concentrate the light along the lens axis. The lamps are backed by a reflector 225 which extends between the frame plates 21, 22.

For the purpose of providing a well-defined "window" at the illuminating station, the carrier is separated from the remainder of the machine by providing a shield or cover plate 230 having a transversely extending edge 231. Any escape of light to the outside of the machine is inhibited by providing a stationary shield 232 which overlies the light source and a cooperating movable shield in the form of a lip or flange 233 which extends along the leading edge of the carrier 30, slightly overlapping the stationary shield when the carrier is in its illustrated "home" position.

For the purpose of protecting the copy sheet in the exposing station from unwanted scatter of light, the optical path, indicated by the axis 240, is enclosed on its top and sides by a shield 241. The amount of light that reaches the copy sheet along the optical path is simply controlled by a curtain 242 which extends the width of the exposing station and which is mounted upon cords 243, one at each end, trained about rollers 244 supported upon a curtain guide plate 245. The cords 243 are coupled to an adjusting knob 246 which is accessible at one side of the machine for varying the degree of lowering of the curtain, i.e., the degree to which the curtain overlaps the projection area at the exposing station.

Prior to a discussion of the features of control and coordination which form an important part of the present invention, it will be helpful to refer to FIGURE 10 which shows, in the form of a schematic diagram, a preferred form of power supply and control circuit. Conventional A-C power may be applied across the two input lines 250, 251 under control of a power switch S1 which controls feeding of current to a main bus 252. Switch S1 thus serves to turn on those components which are required to place the machine in a condition of readiness for feeding a copy sheet. Thus it will be noted in FIG. 10 that when the switch S1 is closed the fan motor 141 and drive motor 150, which drives the rollers, are both turned on. A transformer 253, having its primary connected to the bus 252, is also turned on to apply high voltage to the wires 91, 92 in the corona unit 90. The heater 142 associated with the blower is energized through a set of normally closed contacts 255 on a relay 256. The lamps 221, 222, which are in series with a pair of normally open contacts 257 on the same relay, are initially off, but, as will be seen, these lamps are turned on as a copy sheet is fed into the exposing station.

In accordance with the present invention, means are provided for causing the carrier to move from its home position in the forward or scanning direction upon arrival of a copy sheet at the exposing station and for causing the carrier to retract to the home position upon departure of the trailing edge of the copy sheet from the exposing station. In the present, and preferred, construction this is brought about by providing a first switch S2 which detects the arrival of the leading edge and which energizes the "forward" drive solenoid 193 and a second switch S5 which detects the departure of the trailing edge for deenergizing the "forward" solenoid and energizing the "reverse" solenoid 203 to produce driving of the carrier in the opposite or return direction. The switches are preferably of the single-pole, double-throw type having "forward" and "reverse"contacts as indicated at F, F1, R and R1 respectively under the control of switch arms 258, 259, respectively. The two "forward" contacts, as shown in FIG. 10, are connected in parallel by a jumper 260 so that the forward drive solenoid 193 is energized when a sheet engages either switch.

As a result, when the leading edge of a copy sheet, for example the sheet 61, engages the switch arm indicated at 258, thereby throwing the switch S2 from the "solid" condition to the "dotted" position, contact F closes to complete a circuit to the forward drive solenoid 193 which sucks in its armature 191 thus rocking the frame 190 which carries the gear 186 so that the latter meshes with the forward drive gear 187 coupled to the rack 189. Since the gear 186 is rotating as long as the motor 150 is turned on, the carrier will start to move from its "home" position, in the forward direction, i.e., to the left as viewed in the drawings. Because of the cross shaft 205, the gears 197, 198 at the other side of the machine coupled to the rack 199 insure that the carrier is equally driven at both sides obviating any possibility of skewing or binding as it moves along the guide rails 41, 42.

A short time later, when the leading edge of the sheet engages the arm 259 of the trailing edge switch S5, this switch is also thrown from its "solid" to its "dotted" position. This places this switch in readiness to "take over control" when the trailing edge of the copy sheet leaves the switch S2 to insure that the carrier continuous to move forwardly as long as any portion of the sheet is within the exposing station. As the carrier is thus driven, at precisely the same speed as the copy sheet, the original on the carrier is progressively scanned and its moving image is cast upon the face of the copy sheet as the latter moves through the exposing station.

As the trailing edge of the copy sheet moves into the exposing station, the arm 258 of the switch S2 is released causing the latter switch to be restored to its "solid" position and causing the contact R thereof to be energized. Interconnecting the contact R of the switch S2 is a lead 263 which is connected, by a switch S4, to the central contact of the trailing edge switch S5. The switch S4, which defines the "home" position of the carrier is a simple limit switch having an arm 265 which is engaged by a lug 266 on the carrier 30. The switch is so arranged that when the carrier is in its "home" position, the lug 266 engages the switch arm 265 opening the switch contacts, with such contacts being normally closed at all times when the carrier is away from its "home" position. Thus at the time that the trailing edge of the copy sheet leaves the switch S2, the switch S4 is closd so that current continues to be supplied from the line 251 through contact R of switch S2 through the switch S4 and through the, now closed, contact F1 of switch S5, via the jumper 260 to the forward solenoid.

As a result of the above, the carrier 38 is driven out to the full extent required to scan the original as shown in FIG. 4a. At this point the trailing edge of the copy sheet releases the arm 259 of the switch S5 so that this switch is restored to the "solid" position, shown in FIG. 9 signaling that the end of the copy sheet has been reached. The release of the switch S5 has two effects. In the first place, since the switch contact F1 thereof is opened, the "forward" solenoid 193 is deenergized so that the rocking frame 190 of the forward drive coupling is rocked in the counter clockwise direction by its spring 192, thereby disengaging the forward driving gear 186. Simultaneously, making of the contact R1 of the switch S5 closes the circuit to the "reverse" solenoid 203, the circuit to the supply line 251 being completely through the contact R of the switch S2 and the "home" limit switch S4. This causes the reverse drive train to be completed and since there is no idler and no reduction gear in the reverse drive gear train, movement of the carrier will be in the reverse direction and at double the speed. Since the carrier need not go to its limit of movement, there is a substantial saving in the idle return time of the carrier. Upon arrival of the carrier 30 at its "home" position, the lug 266 on the carrier engages the arm 265 on the "home" limit switch S4, thus opening the switch contacts and cutting off flow of current to the solenoid 203 so that the carrier comes to rest. Since movement of the rollers in the copy sheet transport system is continuous as long as the switch S1 is turned on, the copy sheet is passed through the developing trough 111, through the squeegee rollers 121, 122 past the blast of warm air from the blower 140 and through the expeller rollers 131, 132 onto the collective tray 46.

In accordance with one of the features of the present invention, means are provided for automatically feeding the topmost sheet of the stack of sheets in the reservoir to a "ready" position closely adjacent the inlet rollers of the copy sheet transport system with provision for incrementally advancing the copy sheet into engagement with the transport system, either manually where single copies are desired or automatically upon return of the carrier for the production of multiple copies. The motor 75 is preferably operated with direct current from a D-C supply including a stepdown transformer 270 having a center tapped secondary winding connected to diodes 271, 272 to provide full wave rectification and with filtering by capacitor 273. For automatic positioning of a sheet a normally closed positioning switch S7 is connected in series with the dispenser motor having an arm 274 so arranged that the motor is deenergized when the leading edge arrives at the "ready" position 80. For incrementally advancing the sheet for the making of single copies, a manual switch MS, under control of the push button operator 45 is provided in parallel with the positioning switch. It will be apparent that because of the close spacing between the leading edge of the copy sheet at the "ready" position and the inlet rollers 81, 82 only momentary contact of the push button will suffice to advance the copy sheet across the gap. Once the copy sheet engages the rollers 81, 82 the chain of events discussed above is set in motion including automatic initiation of carrier movement as the leading edge of the copy sheet enters the exposing station.

For initiating the feeding of a copy sheet from the "ready" position to the copy sheet transport when multiple copies are desired, an auxiliary or "repeat" switch is provided in parallel with the manual switch so that the dispenser motor circuit is momentarily closed as the carrier completes its reverse movement back to its "home" position. Thus referring to FIGS. 4 and 4b a switch S9 is provided with a one-way actuating arm 280 having an upstanding cam follower 281 which is held in upright position by means of a spring 282 against a stop surface 283, the cam follower being in the path of an operating cam or lug 284 which is secured to the carrier. During the forward movement of the carrier, the cam follower 281 yields idly (moving to the dotted position shown in FIG. 4b) so that the switch contacts are unaffected. However, upon reverse movement of the carrier, the cam follower 281 is bottomed against its stop 283 so that when the operating lug 284 "wipes by," the switch operating arm 280 is depressed closing the contacts of switch S9 and simulating the closure of the manual push button so that the next copy sheet in the series, waiting in its "ready" position, is advanced into engagement with the inlet rollers 81, 82 to begin another copying cycle.

In carrying out the present invention, a counter having a control switch is employed for normally disabling the repeat switch but which may be set to an "on" or "count" condition in which the repeat switch is permitted to accomplish its function. The counter, indicated at 290, is, per se, of the known self-cancelling type having a control shaft 291 positioned by the dial 47 mounting a cam 292 which closes contacts 293 as long as the knob is displaced from a reference "single copy" position. The self-cancelling feature is provided by a ratcheting relay having a coil 294 operating a ratchet pawl 295 engaging a ratchet wheel 296. The relay coil is connected, as shown, through the contacts 293 to the contact R1 of the switch S5 which is energized to produce the reverse movement of the carrier. Thus each time the carrier is reversed, which signals completion of a copy, the relay coil 294 is energized causing the pawl 295 to "take a tooth" of the ratchet wheel 296.

For the purpose of "enabling" operation of the repeat switch S9 for production of multiple copies, the shaft 291 is provided with a second cam 298 having a set of auxiliary normally-open contacts 297 in series with the contacts of the switch S9. Since the contacts 297 are closed as long as the dial is displaced from its "zero" reference position, and since the repeat switch S9 is closed by the lug 284 during the terminal portion of each movement of the carrier in its reverse direction, each return stroke of the carrier will serve to close the circuit momentarily to the dispenser motor for feeding of the next copy sheet from its ready position into the nip of the inlet rollers 81, 82 of the transport system. As the copies are successively made in automatic sequence, the successive actuations of the relay coil 294 in the counter will ratchet the control shaft and its associated cam 298 back into its reference position, thereby opening the cam operated contacts 297 to prevent the dispensing motor 75 from feeding a sheet to the inlet rollers. In short, the counter is self-disabling, opening the contacts after a predetermined number of copies, set by the counter dial 47, have been produced.

In accordance with one of the more detailed features of the present invention, means are provided for preventing the forward drive coupling from driving the carrier beyond its normal limit of movement in the forward direction as might be caused, for example, by an overlong copy sheet, e.g., a copy sheet which exceeds the length of the carrier platen. This is accomplished by including in the circuit of the "forward" solenoid 193 a limit switch S3 having an arm 340. The arm may be located in the path of movement of the same lug or operating cam 284 which operates the repeat switch S9. Thus, when using an overlong copy sheet having a trailing edge which maintains the contact F1 of the switch S5 closed when the carrier has completed its full stroke, opening of the limit switch S3 at the end of the stroke deenergizes the solenoid 193 as well as the relay 257 which controls the light source. The limit switch S3 does not, however, stop rotation of the rollers in the transport system so that the copy sheet continues to move and is developed and ejected in the usual fashion. Consequently, it will be seen that the use of overlong copy sheets does not cripple the machine and clearance of the sheet from the machine takes place automatically without intervention of the operator, the only effect being that the excess length carries no image and becomes scrap. This self-protecting feature is of particular value in an automatic sheet-fed machine such as the present in which, under unusual circumstances, a second copy sheet may be carried along with a first copy sheet, but in lagging relation, from the sheet reservoir.

For the purpose of replenishing the toner after a predetermined integrated length of copy sheet has passed through the developing trough, a timer 310 is provided which is connected in parallel wth the winding of the "forward" solenoid 193 and which has contacts 311 which are momentarily closed following elapse of a predetermined time interval. The interval may, for example, be four minutes in length corresponding to the processing of 66 copies of letter size. The timer contacts 311 are connected in series with a toner solenoid 312 having a mechanical connection 313 to a toner replenisher indicated diagrammatically at 314. The construction of the toner replenisher is a matter which need not be covered in the present application and it will suffice to say that upon each operation of the toner solenoid 312 is a predetermined amount of toner concentrate is added to the developing fluid. The fluid may be constantly recirculated through the developing trough to insure intimate mixing of the toner concentrate by means of a pump diagrammatically indicated at 320 and supplied with rectified half waves of current through a diode 321.

It is one of the features of the present invention that the heater 142 which warms the air stream from the blower 140 which acts upon the sheets subsequent to development is turned off during the time that the illuminating lamps 221, 222 are turned on but turned on again prior to arrival of the copy sheet from the developing trough. This is accomplished by the relay 256 which is in parallel with the forward drive solenoid 193 which turns the lamps 221, 222 on during the time that they are needed, i.e., during the forward movement of the carrier, while maintaining the heating element 142 turned on at all other times, as long as the main switch S1 is closed.

It is also one of the features of the present invention that L-shaped copy sheet and optical paths are provided which are interfitted in a novel way to produce a machine of rectangular configuration having a high degree of compactness. Thus it will be noted that the copy sheet reservoir 50 itself constitutes the horizontal leg of an L, with the copy sheet passing therefrom upwardly along the vertical leg of the L, with reversal at the top to produce movement downwardly along such vertical leg followed by movement along the horizontal leg for ejection from the machine. The optical path, the axis of which is indicated by the numeral 240 is of shallow L shape, having a vertical leg extruding downwardly from the illuminating station 220 to the mirror 211 and a horizontal leg from the mirror to the exposing station, with the horizontal leg overlying the horizontal ejection leg of the transport path and lying in general parallelism with it. The space above the optical path may be occupied by the blower or other auxiliary components. The nesting of the two L-shaped paths inherently results in a machine which makes efficient use of the internal space and which is thus well suited for portable desk top usage.

However, while the machine is distinguished by its compactness and lightness for portable use, it possesses a feature which has been associated in the past only with larger and heavier console machines, namely, the ability to copy book pages or other originals which must be maintained in flat condition. Thus, in accordance with the invention the carrier is so constructed as to present a transparent platen which extends laterally to the edge of the illuminating or scanning window and which has a closely adjacent clearance space for accommodating the overhanging portion of an open book which is registered with the lateral edge. Thus as shown in FIG. 2 the lateral edge of the carrier frame is made extremely narrow as indicated at 319 with an abrupt drop-off down to the level of the flange 32 which extends along the edge of the carrier thereby providing a clearance space or pocket 341. When a book, indicated at 325, is spread open with the page 326, to be copied, lying flatly against the transparent platen 34, the idle portion 327 of the book is received in the relief 320, making it unnecessary to spread the book to an extent which might run the risk of breaking the binding.

Further in accordance with the invention a supporting bracket is provided for the idle or overhanging portion of the book, which is secured to, and which is movable with, the carrier so that the carrier is being moved and during the time that the exposure is taking place. In the preferred form of the invention the bracket, indicated at 330, is in the form of a flat parallelogram linkage having a pair of spaced, laterally extending members 331, 332 interconnected by an outer member 333. The outer member 333 is preferaby in the form of an angle having pivots 334, 335. The outwardly extending members are similarly pivoted to the flange as indicated at 336. Thus, when not in use, the supporting bracket 330 may simply be swung into nested position alongside the carrier as indicated at 339. With a book positioned for copying as shown in FIG. 2, the weight of the flexible cover 38 will usually be sufficient to hold the book in place with the overhanging portion supported on the bracket, but, if desired, finger tip pressure may be maintained on the top of the cover 338 to maintain the book firmly pressed against the transparent platen 35, the fingers simply "riding along" with the carrier without in any way affecting its speed.

*Résumé of operation*

While the operation of the photocopy machine will be apparent in view of the above description, the operation may be summarized briefly as follows: With the reservoir 50 loaded with a stack of photocopy sheets, face down, the main switch S1 is turned on to start the fan and drive motors and to turn on the heater element. The main switch, moreover, energizes the dispenser motor, through the normally closed switch S7, to advance the top copy sheet 61 into the "ready" position 80, with the leading edge thereof just short of the inlet rollers 81, 82. Engagement of the arm 274 of the positioning switch S7 turns off the dispenser motor.

With an original in place on the carrier, which is in its "home" position, momentary pressing of the manual push button 45 energizes the dispenser motor to advance the sheet from the "ready" position incrementally so that it engages the nip of the rotating inlet rollers 81, 82. The sheet is thus transported through the charging station 90 and into the exposing station 100 where the leading edge actuates the switch S2. Closure of the contact F thereon performs the function of energizing the relay 256 to turn on the illumination and to energize the "forward" solenoid 193 to produce forward scanning movement of the carrier. This movement continues until the trailing edge of the copy sheet leaves the exposing station, whereupon the "forward" solenoid 193 is deenergized and the "reverse" solenoid 203 is energized, accompanied by turning on of the heater, so that the carrier promptly begins its return movement. Such movement is at double the forward speed because of the higher gear ratio in the reverse drive train. The copy sheet continues its movement through the developer trough, squeegee rollers and expeller rollers through the current of warm air from the blower, for deposition upon the collecting tray 46. The carrier continues its return movement until the reverse solenoid is deenergized by opening of the switch S4 at the home position.

In the making of multiple copies, the procedure is the same except that the dial 47 is rotated to indicate the desired number of copies, closing the cam switch 293 and "enabling" operation of the counter relay 294 which is turned on, with the reversing solenoid, during each return stroke of the carrier. Closure of the associated contacts 297, in series with the repeat switch S9, enables the repeat switch to operate the dispenser motor momentarily during the terminal portion of the return stroke of the carrier, thus advancing the next copy sheet, in ready position, into the nip of the inlet rollers 81, 82 to produce a second copy. Each time the counter relay is operated the pawl 295 takes a tooth of the ratchet 296, thus reducing the count by one, until, finally, when the desired number of copies has been completed, the counting is restored to its reference position, opening the contacts 293 so that the repeat switch is no longer effecting and so that no further copies are made. Where it is desired to produce copies beyond the maximum number indicated on the dial, the additional number may be dialed in immediately as the dial is restored to its reference position. Where extremely large numbers of copies are required, the dial may be provided with a "continuous" position C and the cam 292 may be additionally notched out, as shown at 299, so that in the "continuous" position the switch 297 is closed and the switch 293 is open. This effectively disables the self-cancelling feature, and the machine may be left to operate unattended without danger of creep or other risks usually associated with recirculation of an original document. When the supply of sheets is exhausted, operation of the carrier is no longer triggered and the carrier simply comes to rest in its "home" position indicating that replenishment is necessary.

In the following claims the term "station" includes within its scope the usual elements required to perform the function. With respect to use of the term "inlet rollers," it will be understood that this function does not require use of two separate rollers and that a roller or belt may be used, if desired, operating against a polished surface. Moreover, while the invention has been described in connection with a sheet-fed reservoir it will be understood that the invention in certain of its aspects is not limited to sheet feeding and if desired sheets may be fed from a continuous web with an automatic cutter to establish a uniform or desired length.

I claim:

1. In an office type photocopy machine the combination comprising a housing, a transparent original carrier at the top of the housing having an associated illuminating station and mounted for reciprocating movement with respect thereto, a source of photosensitive copy sheets, copy sheet transport means having an associated charging station, exposing station and developing station, stationary optical means for optically coupling the original at the illuminating station with the copy sheet at the exposing station so that the image of the original is cast upon the copy sheet, a driving motor for driving the transport means, forward and reverse drive couplings interposed between the motor and the carrier, means responsive to the arrival of the leading edge of the copy sheet in the exposing station for energizing the forward drive coupling to initiate movement of the carrier in the forward direction, means operated incident to the departure of the trailing edge of the copy sheet from the exposing station for selectively energizing the reverse drive coupling and deenergizing the forward drive coupling for reversing the movement of the carrier, and means responsive to return of the carrier to a home position for deenergizing the reverse drive coupling.

2. In an office type photocopy machine the combination comprising a housing, a transparent original carrier at the top of the housing having an associated illuminating station and mounted for reciprocating movement with respect thereto, a source of photosensitive copy sheets, means for advancing a copy sheet from the source to a ready position, copy sheet transport means having associated charging, exposing and developing stations as well as driven inlet rollers for feeding a copy sheet thereto, stationary optical means for optically coupling the original at the illuminating station with a copy sheet at the exposing station so that the image of the original is cast upon the copy sheet, a driving motor for driving of the transport means including the inlet rollers, means for advancing the copy sheet from the ready position into engagement with the inlet rollers, and control means actuated incident to the arrival of the copy sheet at the exposing station for coupling the motor to the carrier.

3. In an office type photocopy machine the combination comprising a housing, a transparent original carrier at the top of the housing having an associated illuminating station and mounted for reciprocating movement with respect thereto from a home position, a copy sheet dispenser having a dispensing motor and a switch defining a ready position for controlling the dispensing motor so that a sheet is automatically advanced to the ready position, copy sheet transport means having driven inlet rollers, and an associated charging station, exposing station and developing station, stationary optical means for optically coupling the original at the illuminating station with a copy sheet at the exposing station so that the image of the original is cast upon the copy sheet, a drive motor for driving the transport means including the inlet rollers, auxiliary means for energizing the dispensing motor so that the copy sheet is advanced from the ready position into engagement with the inlet rollers, control means actuated incident to arrival of the copy sheet at the exposing station for coupling the carrier to the drive motor, and means operated incident to the departure of the copy sheet from the exposing station for reversing the direction of carrier movement to home position.

4. In an office type photocopy machine the combination comprising a housing, a transparent original carrier at the top of the housing having an associated illuminating station and mounted for reciprocating movement with respect thereto from a home position, a source of photosensitive copy sheets, copy sheet transport means having an associated charging station, exposing station and developing station, stationary optical means for optically coupling the original at the illuminating station with a copy sheet at the exposing station so that the image of the original is cast upon the copy sheet, a driving motor coupled to the carrier and to the transport means, direct and reverse drive couplings interposed between the motor and the carrier, single-pole double-throw switches at the respective edges of the exposing station having "forward" contacts which are engaged by reason of the presence of a copy sheet and "reverse" contacts which are engaged by reason of the absence of a copy sheet, said "forward" contacts being connected in parallel to the direct drive coupling so that the coupling is energized when the leading edge of the copy sheet enters the exposing station and said "reverse" contacts being connected in series to the reverse drive coupling so that the reverse drive coupling is energized when the trailing edge of the copy sheet leaves the exposing station, and means for turing off said reverse drive coupling when the carrier returns to home position.

5. In an office type photocopy machine the combination comprising a housing, a transparent original carrier at the top of the housing having an associated illuminating station and mounted for reciprocating movement with respect thereto from a home position, a source of photosensitive copy sheets, copy sheet transport means having an associated charging station, exposing station and developing station, stationary optical means for optically coupling the original at the illuminating station with a copy sheet at the exposing station so that the image of the original is cast upon the copy sheet, a driving motor coupled to the transport means, single-pole double-throw switches at the respective edges of the exposing station having "forward" contacts which are engaged by reason of the presence of a copy sheet and "reverse" contacts which are engaged by reason of the absence of a copy sheet, forward drive means for driving the carrier forwardly at a rate coordinated with the rate of the copy sheet and reverse drive means for driving the carrier in the reverse direction back to its home position, said "forward" contacts being connected in parallel with the direct drive means so that the carrier moves forwardly upon arrival of the leading edge of the copy sheet at the exposing station and said "reverse" contacts being connected in series with the reverse driving means so that the carrier is reversed when the trailing edge of the copy sheet leaves the exposing station.

6. In an office type photocopy machine the combination comprising a housing, a transparent original carrier at the top of the housing having an associated illuminating station and mounted for reciprocating movement with respect thereto from a home position, a source of photosensitive copy sheets, means for automatically advancing a copy sheet from the source to a ready position, copy sheet transport means having an associated charging station, exposing station and developing station, stationary optical means for optically coupling the original at the illuminating station with the copy sheet at the exposing station so that the image of the original is cast upon the copy sheet, a driving motor for driving the transport means, means including forward and reverse driving clutches interposed between the motor and the carrier, means for advancing a copy sheet from the ready position to the transport means, means responsive to the arrival of the leading edge of the copy sheet in the exposing station for energizing the forward drive clutch to initiate movement of the carrier in the forward direction, means operated following the departure of the trailing edge of the copy sheet from the exposing station for energizing the reverse drive clutch for reversing the movement of the carrier to its home position and control means responsive to the return movement of the carrier for advancing the next copy sheet from the ready position into engagement with the transport means.

7. In an office type photocopy machine the combination comprising a housing, a transparent original carrier at the top of the housing having an associated illuminating station and mounted for reciprocating movement with respect thereto, a copy sheet dispenser having a source of copy sheets and means including a dispensing motor for automatically advancing the leading one of the copy sheets from the source to a ready position, copy sheet transport means having driven inlet rollers and associated charging, exposing and developing stations, a driving motor for driving of the transport means including the inlet rollers, driving means driven by said motor and coupled to the carrier for imparting to the carrier a cycle of forward and reverse movement upon entry of a copy sheet into the exposing station, stationary optical means for optically coupling the original on the carrier at the illuminating station with the copy sheet at the exposing station so that the image of the moving original is cast upon the moving copy sheet, means responsive to return of the carrier for energizing the dispersing motor so that the copy sheet in the ready position is fed into engagement with the inlet rollers for production of plural copies, means for disabling the responsive means after a desired number of copies have been produced, and control means actuated incident to the arrival of the copy sheet at the exposing station for coupling the motor to the carrier.

8. In an office type photocopy machine the combination comprising a housing, a transparent original carrier at the top of the housing having an associated illuminating station and mounted for reciprocating movement with respect thereto, a copy sheet dispenser having a source of copy sheets and means including a dispensing motor for automatically advancing the leading one of the copy sheets from the source to a ready position, copy sheet transport means having driven inlet rollers and an associated charging, exposing and developing stations, a driving motor for driving of the transport means including the inlet rollers, reciprocating means driven by said motor and coupled to the carrier for imparting to the carrier a cycle of forward and reverse movement upon entry of a copy sheet into the exposing station, stationary optical means for optically coupling the original on the carrier at the illuminating station with the copy sheet at the exposing station so that the image of the moving original is cast upon the moving copy sheet, and means including a repeat switch responsive to return of the carrier for energizing the dispensing motor so that the copy sheet in the ready position is fed into engagement with the inlet rollers for production of multiple copies, a settable counter having an on condition for counting the copies passing through the exposing station and which reverts to an off condition upon achieving a desired count, means responsive to said off condition for disabling the repeat switch, and control means actuated incident to the arrival of the copy sheet at the exposing station for coupling the motor to the carrier.

9. In an office type photocopy machine the combination comprising a housing, a transparent original carrier at the top of the housing having an illuminating station and mounted for reciprocating movement with respect to the latter, a copy sheet dispenser having a source of photosensitive copy sheets, and means including a dispensing motor for automatically advancing a sheet from the source to a ready position, copy sheet transport means having associated charging, exposing, and developing stations, means including a drive motor for driving the transport means, forward and reverse driving trains including forward and reverse clutches interposed between the motor and the carrier for reciprocating the latter, switch means responsive to the arrival of the leading edge of the copy sheet at the exposing station for energizing the forward clutch to initiate movement of the carrier, stationary optical means for optically coupling the original on the carrier at the illuminating station with the copy sheet in the exposing station so that the image of the moving original is cast upon the moving copy sheet, said switch means including means for deenergizing the "forward" clutch and energizing the "reverse" clutch following departure of the trailing edge of the copy sheet from the exposing station for reverse movement of the carrier, a repeat switch operated incident to the reverse movement of the carrier for additionally energizing the dispensing motor for feeding the next copy sheet from the ready position to the sheet transport means for the making of multiple copies, and counting means for disabling the repeat switch after the desired number of copies have been made.

10. In an office type photocopy machine the combination comprising a housing, a transparent original carrier at the top of the housing having an illuminating station and mounted for a stroke of movement with respect to the latter, a copy sheet dispenser having a source of photosensitive copy sheets and means including a dispensing motor for automatically advancing a sheet from the source to a ready position, copy sheet transport means having associated charging, exposing, and developing stations, means including a drive motor for driving the transport means, carrier driving means including forward and reverse clutches for reciprocating the latter, switch means responsive to the arrival of the leading edge of the copy sheet at the exposing station for energizing the forward clutch to initiate movement of the carrier, stationary optical means for optically coupling the original on the carrier at the illuminating station with the copy sheet in the exposing station so that the image of the moving original is cast upon the moving copy sheet, said switch means including means operated incident to departure of the trailing edge of the copy sheet from the exposing station for deenergizing the forward clutch and energizing the reverse clutch for reverse movement of the carrier, and a limit switch means responsive to said carriers reaching the end of its stroke for disabling said forward clutch.

11. In an office type photocopy machine the combination comprising a housing, a transparent original carrier at the top of the housing having an associated illuminating station and mounted for reciprocating movement with respect to the latter, a source of photosensitive copy sheets, copy sheet transport means having an associated charging station, exposing station and developing station, driving means including a drive motor for driving the transport means, means for positively coupling the drive motor to the carrier so that the carrier moves at the same speed as the copy sheet, stationary optical means for optically coupling the original at the illuminating station with the copy sheet at the exposing station so that the image of the moving original is cast upon the moving copy sheet, said carrier having a transparent platen extending substantially to the lateral edge thereof and having a supporting bracket at said lateral edge which is recessed below the transparent surface thereby forming a pocket for supporting the overhanging portion of an opened book registered with the lateral edge.

12. In an office type photocopy machine the combination comprising a housing, a transparent original carrier at the top of the housing having an associated illuminating station and mounted for reciprocating movement with respect to the latter, a source of photosensitive copy sheets, copy sheet transport means having an associated charging station, exposing station, and developing station, driving means including a drive motor for driving the transport means, means for positively coupling the drive motor to the carrier so that the carrier moves at the same speed as the copy sheet, stationary opitical means for optically coupling the original at the illuminating station with the copy sheet at the exposing station so that the image of the moving original is cast upon the moving copy sheet, said carrier having a transparent platen extending substantially to the lateral edge thereof and having a supporting bracket at said lateral edge which is recessed below the transparent surface for supporting the overhanging portion of an opened book registered with the lateral edge, said supporting bracket being pivoted to the carrier about a vertical axis for swinging from a laterally extended supporting position to a storage position in which it is nested laterally against the carrier.

13. In an office type photocopy machine the combination comprising a housing, a transparent original carrier at the top of the housing having an associated illuminating station and mounted for reciprocating movement with respect to the station, a source of photosensitive copy sheets, copy sheet transport means defining a transport path having associated charging, exposing, and developing stations, means including a driving motor for driving a copy sheet along said transport bath, selectively energizable forward and reverse drive couplings interposed between the motor and the carrier for reciprocating the latter, stationary optical means for optically coupling the original at the illuminating station with a copy sheet at the exposing station so that the image of the moving original is cast upon the moving copy sheet, said drive couplings including first and second clutch means and associated rack means for driving said carrier in the forward and reverse directions, and means actuated by the copy sheet as it travels along the path for energizing said first and second clutch means in succession.

14. In an office type photocopy machine the combination comprising a housing, a transparent original carrier at the top of the housing having an associated illuminating station and mounted for reciprocating movement with respect to the station, a source of photosensitive copy sheets, copy sheet transport means defining a transport path having associated charging, exposing and developing stations, means including a driving motor for driving a copy sheet along said transport path, forward driving means including a first clutch and associated rack means interposed between the motor and the carrier for advancing the latter at the same speed as the copy sheet, stationary optical means for optically coupling the original at the illuminating station with a copy sheet at the exposing station so that the image of the moving original is cast upon the moving copy sheet, reverse driving means including a second and associated rack means coupled to the carrier, means actuated by a copy sheet for energizing the forward and reverse driping means in succession, said reverse driving means having an output speed which substantially exceeds that of the forward driving means.

15. In an office type photocopy machine the combination comprising a housing, a transparent original carrier at the top of the housing having an associated illuminating station and mounted for reciprocating movement from a home position with respect to the latter, a source of photosensitive copy sheets, copy sheet transport means having an associated charging station, exposing station and developing station, driving means including a drive motor for driving the transport means, stationary optical means for optically coupling the original at the illuminating station with the copy sheet at the exposing station, a forward driving train including a forward clutch and rack and pinion connection means and a reverse driving train including a reverse clutch and rack and pinion connection means, means actuated incident to the arrival of the copy sheet at the exposing station for energizing the forward clutch and means responsive to the departure of the copy sheet from the exposing station for energizing the reverse clutch to effect reciprocation of the carrier, said reverse driving trains having a drive ratio which is such as to produce quick return of the carrier to its home position, and selective means responsive to the return movement for initiating the feeding of a sheet from the same to the transparent means.

16. In an office type photocopy machine the combination comprising a housing, a transparent original carrier having a horizontal illuminating station associated therewith and mounted for reciprocating movement between a home position in which the carriers centered above the housing and an extended position in which the carrier extends beyond the housing, a supporting bracket on one side of the housing to provide support for the carrier when in its extended position, a stack of copy sheets arranged face down in the bottom portion of the housing, transport means for propelling a copy sheet from said stack first upwardly along a first vertical leg then downwardly along an adjacent second vertical leg and then along a horizontal leg for ejection from the machine, charging and exposing stations arranged in the second vertical leg, a developing station arranged along said horizontal leg, means including a mirror for optically coupling the horizontal illuminating station and the vertical exposing station, means including a motor coupled to the transport means and to the carrier so that the original and copy sheet are advanced in unison, and a collecting tray under the supporting bracket for receiving the copy sheets face up from the horizontal leg.

17. In an office type photocopy machine the combination comprising a rectangular housing, a transparent original carrier horizontally arranged in a home position at the top of the housing and conforming to the top of the housing, a source of photosensitive copy sheets, copy sheet transport means having an associated charging station, exposing station and developing station along the length thereof, a drive motor drivingly coupled to the transport means, a forward driving train connected between the carrier and the motor for advancing the carrier forwardly from its home position, a horizontal illuminating station at the top of the housing and adjacent the forward end of the carrier for scanning of the original as the carrier is advanced, and stationary optical means for projecting the scanned image of the original upon the moving copy sheet in the exposing station, a reverse driving train interposed between the carrier and the motor, control means for advancing said original carrier in the forward direction past said illuminating station coincidentally with the advancement of said copy sheet past said exposing station so that the scanned image is projected on said copy sheet at said exposing station coincidentally with the scanning of said original at said illuminating station, means operated incident to completion of the scanning of the original for disengaging the forward drive train and for engaging the reverse drive train for return of the carrier to its home position, and means responsive to return of said original carrier to said home position for disengaging said reverse drive train.

18. A photocopy machine comprising, in combination, a housing of generally rectangular configuration having side walls, first and second end walls, bottom and top, a rectangular original carrier mounted on the top of the machine for reciprocating movement and conforming generally thereto, a copy sheet reservoir at the bottom of the machine including a horizontal stack of sheets together with means for feeding the sheets individually from the stack, means for transporting a copy sheet vertically from the end of the stack about a transport path which extends along a first vertical leg upwardly toward the top of the machine and along a second vertical leg downwardly in the direction of the stack and finally along a horizontal leg for ejection through the second end wall of the machine, the horizontal and vertical legs forming a path of L configuration, means defining a vertical exposing station in the second vertical leg, a charging station in said transport path ahead of the exposing station and a developing station in said path following said exposing station, a horizontal illuminating station at the top of the machine under said carrier adjacent said second end wall, means including a lens and mirror defining an optical path of L configuration nested in the transport path and which extends vertically downward from the illuminating station and then horizontally to the exposing station, and means including a driving motor for driving the copy sheet along said transport path and for driving the carrier in unison therewith so that the scanned image of the original on the moving carrier is projected onto the moving copy sheet.

19. In an office type photocopy machine the combination comprising a housing, a transparent original carrier at the top of the housing having an associated illuminating station and mounted for reciprocating movement with respect thereto from a home position, a source of photosensitive copy sheets, copy sheet transport means having an associated charging station, exposing station and developing station, stationary optical means for optically coupling the moving original at the illuminating station with the moving copy sheet at the exposing station so that the scanned image of the original is cast upon the copy sheet, driving motor means for driving the transport means, forward and reverse drive couplings interposed between the motor and the carrier, means for energizing the forward drive coupling to initiate movement of the carrier in the forward direction, control means for advancing said original carrier in the forward direction past said illuminating station coincidentally with the advancement of said copy sheet past said exposing station so that the scanned image is projected on said copy sheet at said exposing station coincidentally with the scanning of said original at said illuminating station, means operated upon completion of the scanning of the original for energizing the reverse drive coupling and de-energizing the forward drive coupling for reversing the movement of the carrier, and means responsive to return of the carrier to the home position for de-energizing the reverse drive coupling.

References Cited

UNITED STATES PATENTS

| 2,703,280 | 11/1955 | Butterfield | 95—1.7 |
| 2,959,095 | 11/1960 | Magnusson | 88—24 |
| 3,024,716 | 3/1962 | Limberger | 95—75 |
| 3,062,110 | 11/1962 | Shepardson | 95—1.7 |
| 3,083,622 | 4/1963 | Keller | 95—1.7 |
| 3,062,094 | 11/1962 | Mayo | 95—1.7 |

JOHN M. HORAN, *Primary Examiner.*

U.S. Cl. X.R.

355—66